US012763984B2

(12) United States Patent
Elmali et al.

(10) Patent No.: US 12,763,984 B2
(45) Date of Patent: Oct. 13, 2026

(54) SEMI-STATIC HARQ-ACK CODEBOOK CONSTRUCTION FOR FREQUENCY-MULTIPLEXED DOWNLINK DATA TRANSMISSION

(71) Applicant: Nokia Technologies Oy, Espoo (FI)

(72) Inventors: Ugur Baran Elmali, Munich (DE); David Bhatoolaul, Swindon (GB); David Navrátil, Espoo (FI); Naizheng Zheng, Beijing (CN); Volker Pauli, Munich (DE); Athul Prasad, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 435 days.

(21) Appl. No.: 18/258,124

(22) PCT Filed: Jan. 17, 2021

(86) PCT No.: PCT/CN2021/072353

§ 371 (c)(1),
(2) Date: Jun. 16, 2023

(87) PCT Pub. No.: WO2022/151456

PCT Pub. Date: Jul. 21, 2022

(65) Prior Publication Data

US 2024/0056329 A1 Feb. 15, 2024

(51) Int. Cl.
*H04L 12/18* (2006.01)
*H04L 1/00* (2006.01)
(Continued)

(52) U.S. Cl.
CPC ........ *H04L 12/1868* (2013.01); *H04L 1/1812* (2013.01); *H04L 1/1861* (2013.01); *H04L 5/0055* (2013.01)

(58) Field of Classification Search
None
See application file for complete search history.

(56) References Cited

U.S. PATENT DOCUMENTS 12,647,220 B2 * 6/2026 Park ...................... H04L 1/1825
2009/0204866 A1 * 8/2009 Mishuku ............... H04L 1/0007
714/E11.113

(Continued)

FOREIGN PATENT DOCUMENTS

CN 109639398 A 4/2019
CN 110149172 A 8/2019

(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

(Continued)

*Primary Examiner* — Jenee Holland
(74) *Attorney, Agent, or Firm* — McCarter & English LLP

(57) ABSTRACT

Example embodiments of the present disclosure relate to semi-static HARQ-ACK codebook construction for frequency-multiplexed DL data transmission. A first device includes at least one processor; and at least one memory including computer program codes; wherein the at least one memory and the computer program codes are configured to, with the at least one processor, cause the first device to: receive downlink configuration information from a second device, receive at least two frequency-multiplexed downlink transmissions at one downlink data transmission occasion, and set, based on the downlink configuration information and an error state of the frequency-multiplexed downlink data transmissions, an acknowledgment indication in a semi- (Continued)

static HARQ-ACK codebook to be transmitted to the second device for the downlink data transmission occasion.

20 Claims, 6 Drawing Sheets

(51) Int. Cl.

| | |
|---|---|
| ***H04L 1/1607*** | (2023.01) |
| ***H04L 1/1812*** | (2023.01) |
| ***H04L 1/1829*** | (2023.01) |
| ***H04L 1/1867*** | (2023.01) |
| ***H04L 5/00*** | (2006.01) |

(56) References Cited

U.S. PATENT DOCUMENTS

| | | | | |
|---|---|---|---|---|
| 2015/0063179 | A1* | 3/2015 | Yang | H04L 5/14 370/280 |
| 2019/0149271 | A1 | 5/2019 | Yin et al. | |
| 2019/0150181 | A1 | 5/2019 | Kim et al. | |
| 2019/0312713 | A1 | 10/2019 | Yang et al. | |
| 2020/0374844 | A1* | 11/2020 | Takeda | H04L 27/2602 |
| 2020/0413424 | A1* | 12/2020 | Fakoorian | H04L 1/1614 |
| 2021/0014647 | A1* | 1/2021 | Takeda | H04W 72/21 |
| 2021/0051666 | A1* | 2/2021 | Takeda | H04W 72/53 |
| 2021/0067273 | A1* | 3/2021 | Lin | H04L 1/1812 |
| 2021/0258102 | A1* | 8/2021 | Yang | H04L 1/1854 |
| 2022/0052794 | A1* | 2/2022 | Xu | H04L 5/001 |
| 2022/0231796 | A1* | 7/2022 | Xu | H04L 1/1861 |
| 2023/0091636 | A1* | 3/2023 | Khoshnevisan | H04W 8/24 370/329 |
| 2023/0239082 | A1* | 7/2023 | Choi | H04L 1/1896 |
| 2023/0361931 | A1* | 11/2023 | Yang | H04L 5/0053 |
| 2024/0023135 | A1* | 1/2024 | Ye | H04L 1/1822 |
| 2024/0031070 | A1* | 1/2024 | Jung | H04L 1/1812 |
| 2024/0048279 | A1* | 2/2024 | Wang | H04W 72/232 |
| 2024/0072939 | A1* | 2/2024 | Niu | H04L 5/0055 |
| 2024/0137160 | A1* | 4/2024 | Choi | H04L 1/1614 |
| 2025/0266938 | A1* | 8/2025 | Choi | H04L 1/1896 |

FOREIGN PATENT DOCUMENTS

| | | | |
|---|---|---|---|
| CN | 110351837 | A | 10/2019 |
| CN | 110635871 | A | 12/2019 |
| CN | 111034113 | A | 4/2020 |
| CN | 111742510 | A | 10/2020 |
| CN | 111865506 | A | 10/2020 |
| CN | 112166573 | A | 1/2021 |
| WO | 2020/133190 | A1 | 7/2020 |
| WO | 2020/168351 | A1 | 8/2020 |

OTHER PUBLICATIONS

"New Work Item on NR support of Multicast and Broadcast Services", 3GPP TSG RAN Meeting #86, RP-193248, Agenda Item: 9.1.2, Huawei, Dec. 9-12, 2019, 5 pages.

"3rd Generation Partnership Project; Technical Specification Group Radio Access Network; Evolved Universal Terrestrial Radio Access (E-UTRA); Study on single-cell point-to-multipoint transmission for E-UTRA (Release 13)", 3GPP TR 36.890, V13.0.0, Jun. 2015, pp. 1-31.

"FL summary#4 on improving reliability for MBS for RRC_CONNECTED UEs", 3GPP TSG RAN WG1 Meeting #103-e, R1-200xxxx, Agenda Item: 8.12.2, Huawei, Oct. 26-Nov. 13, 2020, 14 pages.

"UCI Enhancements for eURLLC", 3GPP TSG-RAN WG1 #97, R1-1907282, Agenda item: 7.2.6.2, Qualcomm Incorporated, May 13-17, 2019, pp. 1-13.

"3rd Generation Partnership Project; Technical Specification Group Radio Access Network; NR; Physical layer procedures for control (Release 15)", 3GPP TS 38.213, V15.8.0, Dec. 2019, pp. 1-109.

"3rd Generation Partnership Project; Technical Specification Group Radio Access Network; NR; Physical layer procedures for control (Release 16)", 3GPP TS 38.213, V16.3.0, Sep. 2020, pp. 1-179.

"RAN1 Chairman's Notes", 3GPP TSG RAN WG1 Meeting #102-e, Aug. 17-28, 2020, 204 pages.

"RAN1 Chairman's Notes", 3GPP TSG RAN WG1 Meeting #103-e, Oct. 26-Nov. 13, 2020, 230 pages.

Goktepe et al., "Reduced CBG HARQ Feedback for Efficient Multimedia Transmissions in 5G for Coexistence with URLLC Traffic", IEEE International Symposium on Broadband Multimedia Systems and Broadcasting (BMSB), Jun. 6-8, 2018, 5 pages.

"IEEE 802.11", Wikipedia, Retrieved on Jul. 14, 2023, Webpage available at : https://en.wikipedia.org/wiki/IEEE_802.11.

International Search Report and Written Opinion received for corresponding Patent Cooperation Treaty Application No. PCT/CN2021/072353, dated Oct. 20, 2021, 9 pages.

"Other issues for Rel-17 MBS", 3GPP TSG RAN WG1 #102-e, R1-2006658, Agenda Item: 8.12.4, vivo, Aug. 17-28, 2020, 3 pages.

Office Action received for corresponding Chinese Patent Application No. 202180003686.8, dated May 12, 2023, 6 pages of Office Action and no page of translation available.

Office action received for corresponding European Patent Application No. 21918659.0, dated May 22, 2025, 5 pages.

Extended European Search Report received for corresponding European Patent Application No. 21918659.0, dated Sep. 26, 2024, 7 pages.

"Discussion on group scheduling mechanisms", 3GPP TSG RAN WG1 #103-e, R1-2008034, Agenda Item: 8.12.1, CMCC, Oct. 26-Nov. 13, 2020, 14 pages.

"FL summary#3 on improving reliability for MBS for RRC_CONNECTED Ues", 3GPP TSG RAN WG1 Meeting #103-e, R1-2009654, Agenda Item: 8.12.2, Huawei, Oct. 26-Nov. 13, 2020, 62 pages.

"3rd Generation Partnership Project; Technical Specification Group Radio Access Network; NR; Physical layer procedures for data (Release 17)", 3GPP TS 38.214, V17.6.0, Jun. 2023, pp. 1-231.

"3rd Generation Partnership Project; Technical Specification Group Radio Access Network; NR; Multiplexing and channel coding (Release 17)", 3GPP TS 38.212, V17.5.0, Mar. 2023, pp. 1-203.

"3rd Generation Partnership Project; Technical Specification Group Radio Access Network; NR; User Equipment (UE) radio access capabilities (Release 17)", 3GPP TS 38.306, V17.5.0, Jun. 2023, pp. 1-256.

* cited by examiner

SEMI-STATIC HARQ-ACK CODEBOOK CONSTRUCTION FOR FREQUENCY-MULTIPLEXED DOWNLINK DATA TRANSMISSION

RELATED APPLICATION

This application claims priority to PCT Application No. PCT/CN2021/072353 filed Jan. 17, 2021, which is incorporated herein by reference in its entirety.

FIELD

Embodiments of the present disclosure generally relate to the field of telecommunication and, in particular, to a method, device, apparatus and computer readable storage medium for semi-static HARQ-ACK codebook construction for frequency-multiplexed downlink data transmissions.

BACKGROUND

In wireless technologies, retransmission-based error recovery techniques are widely exploited to ensure the reliable transmission of data despite it being received with errors. Typically, Automatic Repeat reQuest (ARQ), which is implemented for Radio Link Control (RLC) acknowledged mode, and Hybrid Automatic Repeat reQuest (HARQ), which is implemented in the Medium Access Control (MAC)/Physical Layer (PHY) radio sublayer, are used to tailor the retransmission of data for improving the reliability of radio links. These methods greatly improve the spectral efficiency of communication over radio fading channels.

Furthermore, Point to Multi-Point (PTM) transmissions have been developed to provide Multicast and Broadcast System (MBS) services to improve the transmission efficiency from a network device to multiple users. Also, the MBS services may use the same radio framework as a unicast service (i.e., a Point to Point (PTP) transmission), and thus for UEs in RRC_CONNECTED state, there may be scenarios in which at least two downlink transmissions are frequency-multiplexed and transmitted to a user equipment at one downlink data transmission occasion and an acknowledgement indication should be transmitted to the network to indicate whether to and how to retransmit the frequency-multiplexed downlink transmissions. There is still no widely agreed solution for these scenarios.

SUMMARY

In general, example embodiments of the present disclosure provide a solution for semi-static HARQ-ACK codebook construction for frequency-multiplexed downlink data transmissions.

In a first aspect, there is provided a first device. The first device includes at least one processor; and at least one memory including computer program codes; wherein the at least one memory and the computer program codes are configured to, with the at least one processor, cause the first device to: receive downlink configuration information from a second device, receive at least two frequency-multiplexed downlink data transmissions at one downlink data transmission occasion, and set, based on the downlink configuration information and the error state of the frequency-multiplexed downlink data transmissions, an acknowledgement indication in a semi-static HARQ-ACK codebook to be transmitted to the second device for the downlink data transmission occasion.

In a second aspect, there is provided a method. The method includes receiving, at a first device, downlink configuration information from a second device; receiving at least two frequency-multiplexed downlink data transmissions at one downlink data transmission occasion; and setting, based on the downlink configuration information and the error state of the frequency-multiplexed downlink data transmissions, an acknowledgement indication in a semi-static HARQ-ACK codebook to be transmitted to the second device for the downlink data transmission occasion.

In a third aspect, there is provided an apparatus comprising means for receiving, at a first device, downlink configuration information from a second device; means for receiving at least two frequency-multiplexed downlink data transmissions at one downlink data transmission occasion; and means for setting, based on the downlink configuration information and the error state of the frequency-multiplexed downlink data transmissions, an acknowledgement indication in a semi-static HARQ-ACK codebook to be transmitted to the second device for the downlink data transmission occasion.

In a fourth aspect, there is provided a non-transitory computer readable medium comprising program instructions for causing an apparatus to perform at least the method according to the above second aspect.

With the solution of the present disclosure, a unified semi-static HARQ-ACK codebook may be constructed when receiving different unicast/MBS services without creating significant uplink overhead such as on PUCCH, and the construction of the semi-static HARQ-ACK codebook may also take requirements of the unicast/MBS services into account.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
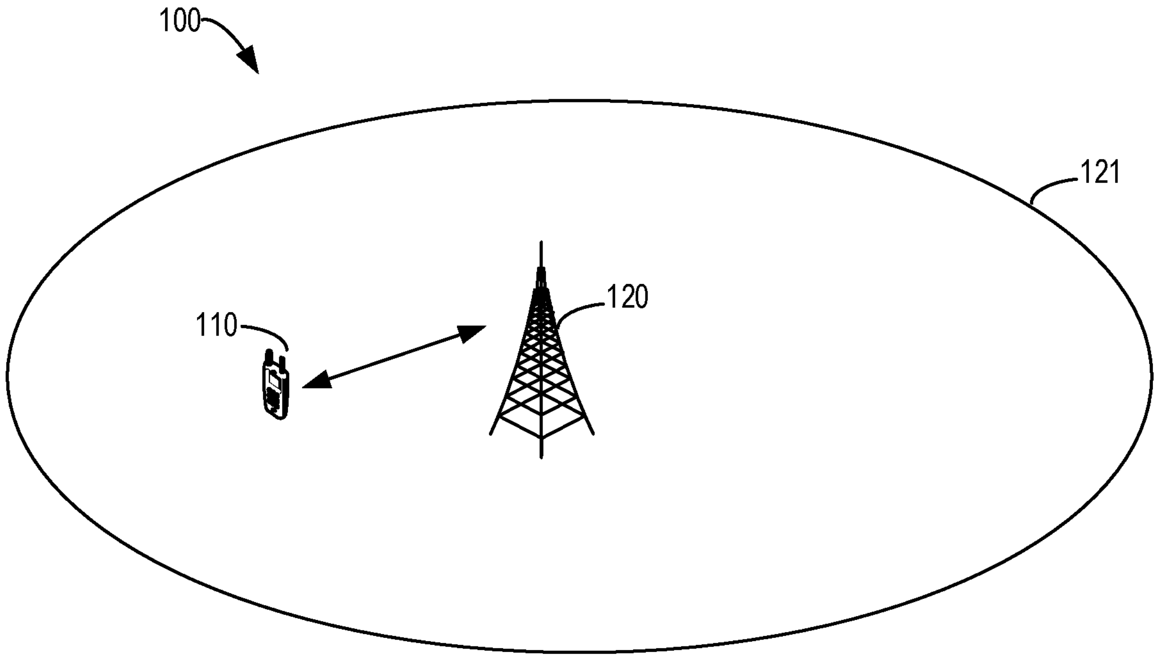
FIG. 1 illustrates an example communication system in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry), and (b) combinations of hardware circuits and software, such as (as applicable):

(i) a combination of analog and/or digital hardware circuit(s) with software/firmware, and (ii) any portions of hardware processor(s) with software (including digital signal processor(s), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto node, a pico node, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As stated above, when different MBS downlink (DL) transmissions or at least one MBS DL transmission and a unicast DL transmission are frequency-multiplexed and received at one DL data transmission occasion such as a Physical DL Shared Channel (PDSCH) occasion, and their HARQ feedbacks are scheduled to be sent at a same later slot, then a HARQ-ACK codebook should be carefully constructed. For this, there is a proposal that one HARQ-ACK codebook for each of the received MBS services and one HARQ-ACK codebook for unicast services may be simultaneously constructed and concatenated to get one HARQ-ACK codebook for all the DL transmissions. The concatenated codebook is sent via an uplink (UL) control channel to the network device. However, such a solution may create significant UL control channel overhead, and in a resource limited system, available UL control channel resources may not even meet the requirements stemming from this approach.

The embodiments of the present disclosure are providing a solution for construction of a semi-static HARQ-ACK codebook for frequency-multiplexed DL data transmissions. In the solution, a network device may configure DL configuration information for a terminal device indicating how to set a semi-static HARQ-ACK codebook for DL data transmissions that are frequency-multiplexed at one DL data transmission occasion. The terminal device may receive the DL configuration information and the frequency-multiplexed DL transmissions and set an acknowledgement indication in the semi-static HARQ-ACK codebook for the retransmission of the DL data transmissions. The DL configuration information may be simply a 1-bit field newly added to or reused in an existing DL control message. Depending on the DL control message including such DL configuration information, the solution may have several sub-solutions as described below.

Principle and embodiments of the present disclosure will be described in detail below with reference to the accompanying drawings. Reference is first made to FIG. 1, which illustrates an example communication system 100 in which example embodiments of the present disclosure may be implemented. The system 100 may include one or more terminal devices, such as a terminal device 110 (hereinafter may also be referred to as a first device 110), and one or more network devices, such as a network device 120 (hereinafter may also be referred to as a second device 120) which serves an area 121 (also called as a cell 121) using different frequency bands in both DL and UL. Such a frequency band may also be referred to as an operating frequency band of the corresponding network device. The terminal device 110 is capable of connecting and communicating in the UL and DL with the network device 120 as long as the terminal device 110 being located within the corresponding cell 121. In communication systems, an UL refers to a link in a direction from a terminal device 110 to a network device 120, and a DL refers to a link in a direction from the network device 120 to the terminal device 110. In particular, the DL may further include DL control channels such as the Physical DL Control Channel (PDCCH) to transmit control information from the network device 120 to the terminal device 110. The DL may further include DL data channels such as the PDSCH to transmit data from the network device 120 to the terminal device 110. For example, the second device 120 may transmit the DL control information (DCI) on the PDCCH, which include the resource allocation information, the modulation and coding scheme (MCS), the HARQ associated with the PDSCH, and the bandwidth part (BWP) where the traffic is scheduled. Further, the network device 120 may support the MBS and deliver multicast transmissions to a group of terminal devices 110 (only one terminal device 110 is shown in FIG. 1) in a multicast or broadcast manner. And, the network device 120 may also deliver a unicast transmission to the same terminal device 110 at the same DL data transmission occasion such as a PDSCH occasion as the multicast transmissions. By decoding the DCI, the terminal device 110 may then correctly receive the multicast transmission and the unicast transmission at that DL data transmission occasion. Similarly, the DL may further include UL control channels such as the Physical UL Control Channel (PUCCH) to transmit control information for transmissions from the terminal device 110 to the network device 120. The UL may further include UL data channels such as Physical UL Shared Channel (PUSCH) to transmit data from the terminal device 110 to the network device 120.

It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices 110 may be located in the cell 121.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In 3GPP Rel-15, only one HARQ-ACK codebook (either semi-static (Type-1) or dynamic (Type-2) depending on the RRC configuration) is constructed and sent by the terminal device in a slot on a PUCCH resource, even when there are multiple unicast services that the terminal device is interested in and the HARQ-ACK feedback for those services are scheduled to be transmitted in the same UL slot. In 3GPP Rel-16, although up to two HARQ-ACK codebooks may be constructed for each service priority, i.e., high priority Ultra Reliable Low Latency Communication (URLLC) and low priority Enhanced Mobile Broadband (eMBB), only one HARQ-ACK codebook is sent by the terminal device at a time instance, even when there are multiple services that are scheduled to provide HARQ-ACK feedback at the same time instance.

According to Rel-15 semi-static HARQ-ACK codebook construction procedure, a negative acknowledgment (NACK) is sent even if there are no actual transmissions at a PDSCH occasion. Thus, the semi-static HARQ-ACK codebook may contain a significant amount of irrelevancy, whereas since the codebook size is fixed, it is advantageous compared to a dynamic codebook in terms of Discontinuous Transmission (DTX) occasions, i.e. when a dynamic codebook is being used, DTX occasions may cause the terminal device and the network device to have different understanding in the size and content of the HARQ-ACK codebook.

In Rel-15 and Rel-16, the terminal device does not support two separate transmission blocks (TBs) fully or partly overlapping in time. Therefore, construction of only one HARQ-ACK codebook (per prioritization in Rel-16) without any concatenation of separate codebooks was enough for proper operation. However, since different MBS PDSCHs and unicast PDSCH may be frequency-multiplexed based on UE capability in Rel-17, construction of only one semi-static HARQ-ACK codebook for different services is not possible for the PDSCH occasions of the frequency-multiplexed transmissions.

Hence, the present disclosure proposes a solution for efficiently constructing a semi-static HARQ-ACK codebook for frequency-multiplexed DL data transmissions, especially in case that DL transmissions of multiple unicast/MBS services with the same priority level are frequency-multiplexed and received at the same DL data transmission occasion by the terminal device, and HARQ-ACK feedback for those transmissions are scheduled to be sent at the same time instance.

Figure 2:
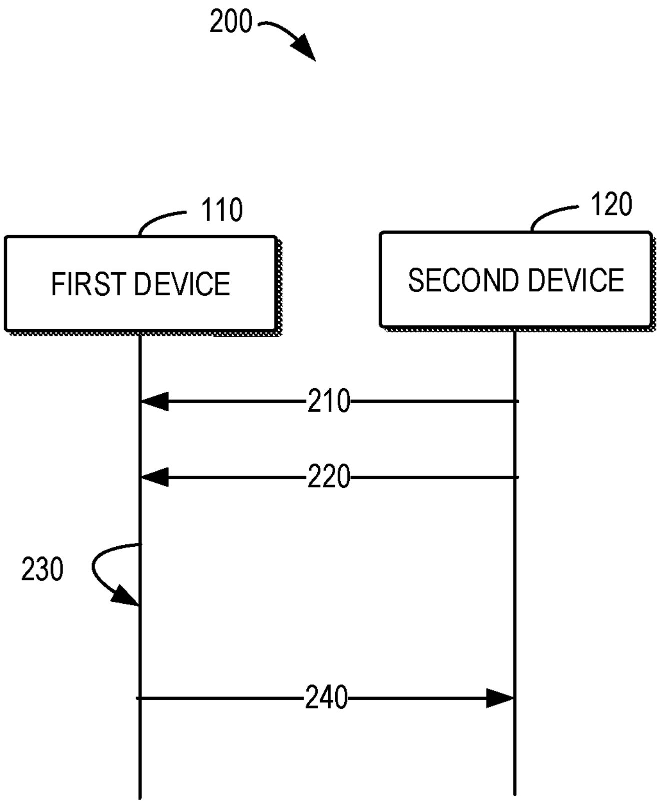
FIG. 2 illustrates a flowchart illustrating a process for constructing a semi-static HARQ-ACK codebook according to some example embodiments of the present disclosure.

Reference is now made to FIG. 2, which shows a process 200 for constructing a semi-static HARQ-ACK codebook according to some example embodiments of the present disclosure. For the purpose of discussion, the process 200 will be described with reference to FIG. 1. The process 200 may involve the terminal device 110 and the network device 120 as illustrated in FIG. 1.

In the process 200, at block 210, the terminal device 110 may receive DL configuration information from the network device 120. The DL configuration information may indicate the terminal device 110 how to configure a HARQ-ACK codebook for the DL data transmissions the terminal device 110 receives. In particular, in the present disclosure, the DL configuration information may be used to indicate how to configure an acknowledgement indication (i.e. ACK or NACK) in a semi-static HARQ-ACK codebook for a DL data transmission occasion at which at least two DL data transmissions from different unicast/MBS services are frequency-multiplexed.

The DL configuration information may be configured to be a new signaling in the communication system. However, this may significantly affect the whole system signaling standards. Therefore, to efficiently convey the DL configuration information, several solutions may be conceived reusing current DL signaling, which will be described in detail below.

At block 220, the terminal device 110 may receive at least two frequency-multiplexed DL data transmissions at one DL data transmission occasion. That is, the at least two DL data transmissions may be transmitted from the network device 120 to the terminal device 110 at one DL data transmission occasion such as a PDSCH occasion.

As described above, in some example embodiments, the at least two frequency-multiplexed DL data transmissions may include at least two frequency-multiplexed MBS transmissions. In some other example embodiments, the at least two frequency-multiplexed DL data transmissions may include a unicast DL transmission that is frequency-multiplexed with one or more MBS DL transmissions.

At block 230, the terminal device 110 may set an acknowledgement indication in the semi-static HARQ-ACK codebook for the DL data transmission occasion based on the DL configuration information and the error state of the frequency-multiplexed DL data transmissions. Each bit of the semi-static HARQ-ACK codebook may indicate whether a DL transmission at the DL data transmission occasion was received successfully or not. In case that a DL data transmission was received successfully, a positive acknowledgement (ACK) may be set for the bit corresponding to the DL data transmission occasion. Otherwise, if a DL data transmission was received with error, a negative acknowledgement (NACK) may be set for the bit corresponding to the DL data transmission occasion.

At block 240, the terminal device 110 may transmit the semi-static HARQ-ACK codebook as constructed at block 230 to the network device 120. The semi-static HARQ-ACK codebook may be transmitted to the network device 120 via an UL control channel such as a PUCCH. The network device 120 may receive and decode the semi-static HARQ-ACK codebook to obtain respective acknowledgement indications for previous DL data transmissions. If a positive acknowledgement (ACK) is set for a DL data transmission occasion, the DL data transmission made at that DL data transmission occasion need not to be retransmitted from the network device 120 to the terminal device 110. Otherwise, if a negative acknowledgement (NACK) is set for a DL data transmission occasion, the DL data transmission made at that DL data transmission occasion needs to be retransmitted from the network device 120 to the terminal device 110.

Figure 3:
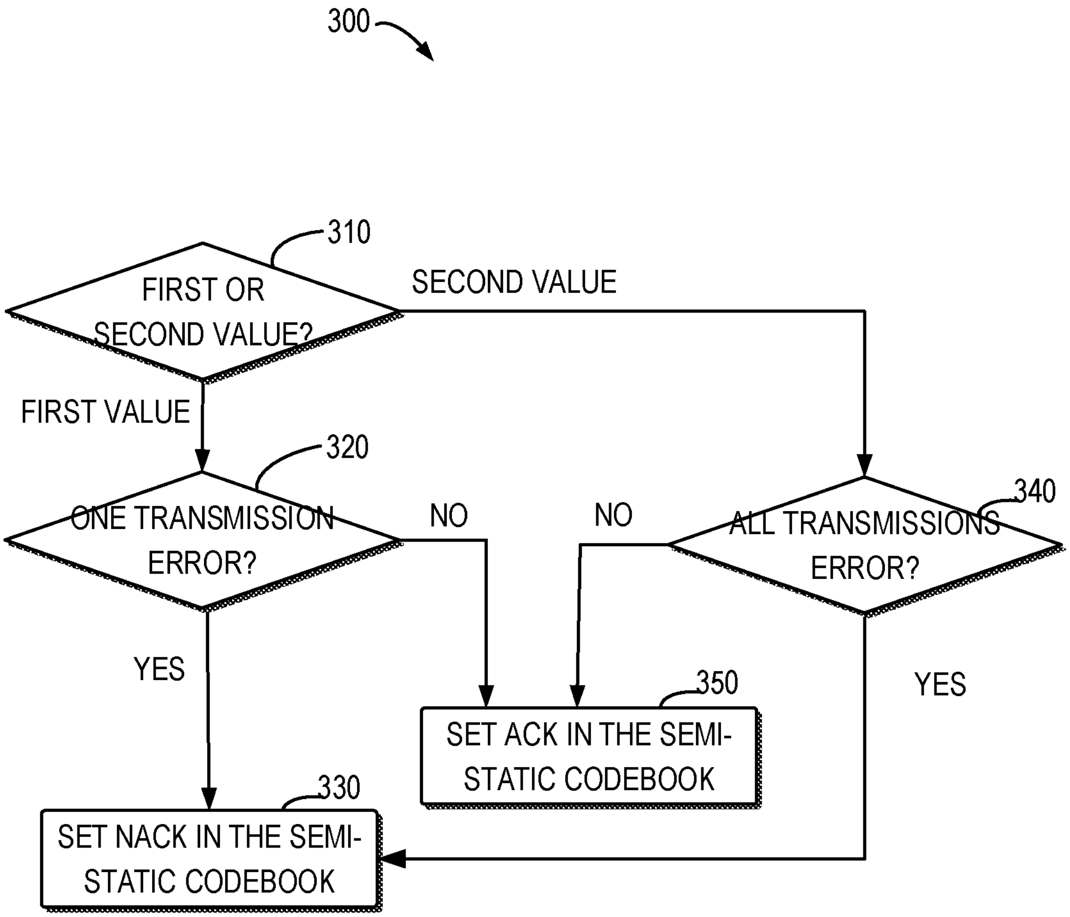
FIG. 3 illustrates a flowchart of an example method implemented at a terminal device in accordance with some example embodiments of the present disclosure.

FIG. 3 shows a flowchart of an example method 300 implemented at a terminal device 110 in accordance with some example embodiments of the present disclosure. Especially, the example method 300 may illustrate a further implementation of block 230 of FIG. 2, and other blocks, such as blocks 210 and 220, are omitted from FIG. 3 to make it concise. In the example method 300, user-specific control signaling such as user-specific Radio Resource Control (RRC) signaling may be reused to carry the DL configuration information. Therefore, at block 210 (now shown in FIG. 3), the terminal device 110 may receive the user-specific control signaling from the network device 120 including the DL configuration information indicating how to set the acknowledgement indication in the semi-static HARQ-ACK codebook.

In particular, the network device 120 may add a new 1-bit field or reuse a 1-bit field of the user-specific control signaling to include the DL configuration information. This field may indicate how the terminal device 110 should include an acknowledgement indication (ACK or NACK) to the semi-static HARQ-ACK codebook for a DL data transmission occasion such as a PDSCH occasion when there are frequency-multiplexed unicast/MBS services with the same priority. Depending on the value of the field, the terminal device 110 should either include a NACK in the semi-static HARQ-ACK codebook for the corresponding DL data transmission occasion only when all the DL data transmissions (i.e., all unicast and/or MBS transmissions) are received with error or when any one of the DL data transmissions is received with error. For example, if the 1-bit field is set to a first value (1, for example), it indicates that a NACK should be set when any one of the DL data transmissions is received with error, and an ACK should be set when none of the DL data transmissions is received with error. On the other hand, if the 1-bit field is set to a second value (0, for example), it indicates that a NACK should be set when all of the DL data transmissions are received with error, and an ACK should be set if any one of the DL data transmissions is received without error.

Please note that the example method 300 only illustrates the case that at least two frequency-multiplexed DL data transmissions are received at a DL data transmission occasion such as a PDSCH occasion. If there are no frequency-multiplexed DL data transmissions for the DL data transmission occasion, i.e., only one unicast or MBS transmission is received, the terminal device 110 may follow previous HARQ-ACK codebook construction procedure such as that in 3GPP Rel-15/16.

At block 310 of the method 300, the terminal device 110 may determine a value of the DL configuration information. As described above, different values of the DL configuration information may indicate different rules to set the NACK and ACK in the HARQ-ACK codebook.

If it is determined that the value of the DL configuration information is the first value (1, for example) at block 310, at block 320, the terminal device 110 may determine whether one of the at least two frequency-multiplexed DL data transmissions is received with error.

If it is determined that one of the at least two frequency-multiplexed DL data transmissions is received with error ("YES" at block 320), at block 330, the terminal device 110 may set the acknowledgement indication in the semi-static HARQ-ACK codebook to be NACK based on the first value of the DL configuration information.

Otherwise, if it is determined that the value of the DL configuration information is the second value (0, for example) at block 310, at block 340, the terminal device 110 may determine whether all of the at least two DL transmissions are received with error.

If it is determined that all of the at least two DL transmissions are received with error ("YES" at block 340), the method 300 goes to block 330, in which the terminal device 110 may set the acknowledgement indication in the semi-static HARQ-ACK codebook to be NACK based on the second value of the DL configuration information.

On the other hand, if it is determined at block 320 that all of the at least two DL transmissions is received without error ("NO" at block 320) or if it is determined at block 340 that not all of the at least two DL transmissions are received with error ("NO" at block 340), at block 350, the terminal device 110 may set the acknowledgement indication in the semi-static HARQ-ACK codebook to be ACK.

The method 300 may be adaptively applied for different services with different requirements such as packet loss rate requirements. For example, if some of the services that the terminal device 110 is receiving have stringent packet loss rate requirements (or if they can tolerate a high amount of retransmissions and/or may not have stringent delay requirements), the network device 120 may configure the DL configuration information to be the first value, so that the terminal device 110 should send a NACK for the DL data transmission occasion when any of the received at least two DL transmissions is received with an error. In this way, even one error in one of the unicast/MBS services can lead to a NACK in the semi-static HARQ-ACK codebook for the corresponding DL data transmission occasion, and thus the network device 120 should retransmit all of the at least two DL transmissions. This may bring gain in the PUCCH resource consumption and reliability of the services especially in case that the spectral efficiency degradation is less important in the system.

On the other hand, if any one of the services that the terminal device 110 is receiving has stringent delay requirements, the network device 120 may configure the DL configuration information to be the second value, so that the terminal device 110 should send a NACK for the DL data transmission occasion only when all of the received at least two DL transmissions are received with error. In this way, a NACK in the semi-static HARQ-ACK codebook for the corresponding DL data transmission occasion occurs only when all of the DL transmissions are received with error. This may meet stringent delay requirements of unicast/MBS services as much as possible.

Although the method 300 is illustrated in FIG. 3 as a complete procedure, those skilled in the art may understand that the two branches may be implemented independently. That is, the network device 120 may configure the DL configuration information to be a fixed value (the first value or the second value) if all the services in the system 100 have the same packet loss rate requirements or delay requirements. In this case, block 310 may be omitted and only one of branches 320-330 and 340-330 is implemented.

Figure 4:
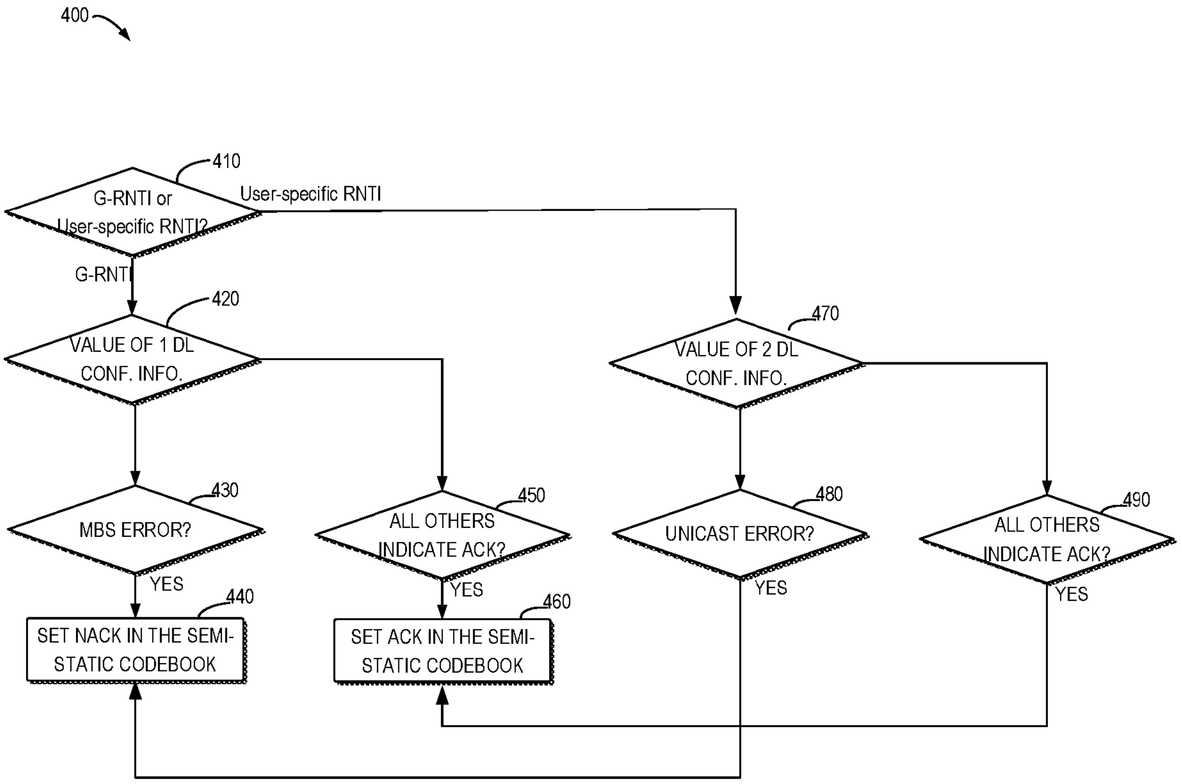
FIG. 4 illustrates a flowchart of another example method implemented at a terminal device in accordance with some other example embodiments of the present disclosure.

FIG. 4 shows a flowchart of another example method 400 implemented at a terminal device 110 in accordance with some other example embodiments of the present disclosure. Especially, the example method 400 may illustrate a further implementation of block 230 of FIG. 2, and other blocks, such as blocks 210 and 220, are omitted from FIG. 4 to make it concise. In the example method 400, a group-common Radio Network Temporary Identifier (G-RNTI) may be used to carry the DL configuration information. Therefore, at block 210 (now shown in FIG. 4), the terminal device 110 may receive the G-RNTI from the network device 120 including the DL configuration information (first DL configuration information, to distinguish from that for the unicast services) indicating how to set the acknowledgement indication in the semi-static HARQ-ACK codebook for an MBS service of the terminal device 110. Furthermore, at block 210 (now shown in FIG. 4), the terminal device 110 may receive user-specific control signaling from the network device 120 including the DL configuration information (second DL configuration information, to distinguish from that for the MBS service) indicating how to set the acknowledgement indication in the semi-static HARQ-ACK codebook for a unicast service of the terminal device 110.

In particular, the network device 120 may add a new 1-bit field or reuse a 1-bit field of the G-RNTI and/or the user-specific control signaling to include the DL configuration information (the first DL configuration information and/or the second DL configuration information). A G-RNTI is the RNTI value that is used to scramble the CRC of a group-common PDCCH/PDSCH transmission of a specific MBS service. Since different MBS services have distinct G-RNTI values, such DL configuration information would indicate whether a NACK should be added to the semi-static HARQ-ACK codebook at a DL data transmission occasion when the corresponding MBS service whose PDCCH/PDSCH is scrambled by that G-RNTI is received with an error and there are other frequency-multiplexed unicast/MBS services received by the terminal device 110 at the same DL data transmission occasion.

Since the G-RNTI is an MBS-specific configuration, i.e., the network device 120 scrambles the PDCCH and PDSCH transmission with a G-RNTI that is targeting only the terminal devices that are interested in and allowed to receive a specific MBS service, the first DL configuration information in the G-RNTI cannot be used to define the behavior of the terminal device 110 for unicast transmissions. To have the unicast counterpart of the first DL configuration information, the network device 120 should configure with another 1-bit field as the second DL configuration information that indicates whether a NACK should be added or not to the semi-static HARQ-ACK codebook at a DL data transmission occasion when a unicast service is received with an error and there are other frequency-multiplexed MBS services received by the terminal device 110.

Please note that the example method 400 only illustrates the case that at least two frequency-multiplexed DL transmissions are received at a DL data transmission occasion. If there are no frequency-multiplexed DL transmissions for the DL data transmission occasion, i.e., only one unicast or MBS transmission is received, the terminal device 110 may follow previous HARQ-ACK codebook construction procedure such as that in 3GPP Rel-15/16.

At block 410 of the method 400, the terminal device 110 may determine whether the at least two frequency-multiplexed DL data transmissions includes an MBS transmission scrambled by the G-RNTI. For example, the terminal device 110 may descramble the frequency-multiplexed DL data transmission with the G-RNTI to determine whether there is a DL data transmission scrambled by the G-RNTI.

If it is determined that the at least two frequency-multiplexed DL data transmissions include an MBS transmission scrambled by the G-RNTI ("G-RNTI" at block 410), at block 420, the terminal device 110 may determine a value of the first DL configuration information.

If it is determined that the value of the first DL configuration information is a first value (1, for example) at block 420, at block 430, the terminal device 110 may determine whether the MBS transmission corresponding to the G-RNTI is received with error.

If it is determined that the MBS transmission corresponding to the G-RNTI is received with error ("YES" at block 430), the method 400 goes to block 440, in which the terminal device 110 may set the acknowledgement indication to be a NACK according to the first value of the first DL configuration information. If it is determined that the MBS transmission corresponding to the G-RNTI is received without error (NO at block 430), the terminal device 110 may set the acknowledgement indication to be ACK if all other DL data transmissions indicate ACKs (not shown in the figure). That is, if the first DL configuration information is set to be the first value, the acknowledgement indication for this DL data transmission occasion should be set to ACK only if all other DL data transmissions indicate ACKs.

Otherwise, if it is determined that the value of the first DL configuration information is a second value (0, for example) at block 420, at block 450, the terminal device 110 may determine whether all other DL data transmissions indicate ACKs.

If it is determined that all other DL data transmissions indicate ACKs ("YES" at block 450), the method 400 goes to block 460, in which the terminal device 110 may set the acknowledgement indication to be an ACK. If it is determined that not all other DL data transmissions indicate ACKs ("NO" at block 450), the method 400 goes to block 440, in which the terminal device 110 may set the acknowledgement indication to be a NACK (not shown in the figure). That is, if the first DL configuration information is set to a second value, regardless of whether the MBS transmission corresponding to the G-RNTI is received with error or not, the acknowledgement indication for this DL data transmission occasion should be set to ACK or NACK depending on whether all other DL data transmissions at this DL data transmission occasion indicate ACKs or NACKs.

On the other hand, if it is determined that the at least two frequency-multiplexed DL data transmissions include a unicast DL transmission scrambled by a user-specific RNTI ("user-specific RNTI" at block 410), at block 470, the terminal device 110 may determine a value of the second DL configuration information.

If it is determined that the value of the second DL configuration information is a first value (1, for example) at block 470, at block 480, the terminal device 110 may determine whether the unicast DL transmission is received with error.

If it is determined that the unicast DL transmission is received with error ("YES" at block 480), the method 400 also goes to block 440, in which the terminal device 110 may set the acknowledgement indication to be a NACK according to the first value of the second DL configuration information. If it is determined that the unicast DL transmission is received without error (NO at block 480), the terminal device 110 may set the acknowledgement indication to be ACK if all other DL data transmissions indicate ACKs (not shown in the figure). That is, if the second DL configuration information is set to be the first value, the acknowledgement indication for this DL data transmission occasion should be set to ACK only if all other DL data transmissions indicate ACKs.

Otherwise, if it is determined that the value of the second DL configuration information is a second value (0, for example) at block 470, at block 490, the terminal device 110 may determine whether all other DL data transmissions indicate ACKs.

If it is determined that all other DL data transmissions indicate ACKs ("YES" at block 490), the method 400 goes to block 460, in which the terminal device 110 may set the acknowledgement indication to be an ACK. If it is determined that not all other DL data transmissions indicate ACKs ("NO" at block 490), the method 400 goes to block 440, in which the terminal device 110 may set the acknowledgement indication to be a NACK (not shown in the figure). That is, if the second DL configuration information is set to a second value, regardless of whether the unicast transmission is received with error or not, the acknowledgement indication for this DL data transmission occasion should be set to ACK or NACK depending on whether all other DL data transmissions indicate ACKs or NACKs at this DL data transmission occasion.

In some example embodiments, the second DL configuration information may include a plurality of fields for unicast services with different priorities each field indicating how to set the acknowledgement indication for the corresponding unicast service. For example, the second DL configuration information may include a first field for a first unicast service with high priority such as an Ultra Reliable Low Latency Communication (URLLC) service. The second DL configuration information may also include a second field for a second unicast service with low priority such as an Enhanced Mobile Broadband (eMBB) service.

In this case, at block 410, the terminal device 110 may further determine whether the at least two frequency-multiplexed DL data transmissions include a unicast DL transmission scrambled by a user-specific RNTI corresponding to one unicast service with one priority. If it is determined that such as unicast DL transmission is included at block 410, at block 470, the terminal device 110 may determine the value of the second DL configuration information. Then, if it is determined that the value of the second DL configuration information is a third value at block 470, at block 480, the terminal device 110 may determine whether the unicast DL transmission is received with error. If it is determined that the unicast DL transmission is received with error ("YES" at block 480), the method 400 goes to block 440, in which the terminal device 110 may set the acknowledgement indication to be NACK. If it is determined that the unicast DL transmission is received without error ("NO" at block 480), the terminal device 110 may set the acknowledgement indication to be ACK if all other DL data transmissions indicate ACKs (not shown in the figure). That is, if the second DL configuration information is set to be the third value, the acknowledgement indication for this DL data transmission occasion should be set to ACK only if all other DL data transmissions indicate ACKs.

Otherwise, if it is determined that the value of the second DL configuration information is a fourth value at block 470, at block 490, the terminal device 110 may determine whether all other DL data transmissions indicate ACKs, and the method 400 goes to block 460, in which the terminal device 110 may set the acknowledgement indication to be an ACK if all other DL data transmissions indicate ACKs. If it is determined that not all other DL data transmissions indicate ACKs ("NO" at block 490), the method 400 goes to block 440, in which the terminal device 110 may set the acknowledgement indication to be a NACK (not shown in the figure). That is, if the second DL configuration information is set to a fourth value for a predetermined unicast service with a predetermined priority, regardless of whether the unicast transmission is received with error or not, the acknowledgement indication for this DL data transmission occasion should be set to ACK or NACK depending on whether all other DL data transmissions indicate ACK or NACK at this DL data transmission occasion.

In other words, in these example embodiments, the network device 120 may configure the DL configuration information for unicast services with different priorities such that the terminal device 110 should retransmit the corresponding DL unicast transmission only if the DL unicast transmission is received with error and the field for the unicast service with corresponding priority is set to a predetermined value (1, for example). By having such different configurations for services with different priorities, different multiplexing rules to the semi-static HARQ-ACK codebook may be flexibly introduced so that different services with different priorities may have different HARQ-ACK behaviors.

On the other hand, if it is determined at block 430 that the MBS transmission corresponding to the MBS service is received without error ("NO" at block 430) or if it is determined at block 480 that the unicast DL transmission is received without error ("NO" at block 480), the terminal device 110 may set the acknowledgement indication in the semi-static HARQ-ACK codebook to be ACK (not shown in the figure).

In addition, if it is determined at block 410 that the at least two DL transmissions include neither an MBS transmission corresponding to the G-RNTI nor a unicast transmission, or if it is determined at blocks 420 or 470 that the DL configuration information is not configured, the terminal device 110 may follow previous HARQ-ACK codebook construction procedure such as that in 3GPP Rel-15/16 (not shown in the figure).

The method 400 may be adaptively applied for different MBS services with different requirements such as packet loss rate requirements. For example, if the MBS service that the terminal device 110 is receiving has stringent packet loss rate requirements (or if it can tolerate high amount of retransmissions and/or may not have stringent delay requirements), the network device 120 may configure the first DL configuration information in the G-RNTI for the MBS service to be a first predetermined value (1, for example), so that the terminal device 110 may send a NACK for the DL data transmission occasion when this MBS service is received with an error along with other frequency-multiplexed transmissions. In this way, only an error in the corresponding MBS service may lead to a NACK in the semi-static HARQ-ACK codebook for the corresponding DL data transmission occasion, and thus the network device 120 should retransmit all of the at least two DL transmissions, as in the method 300.

Since G-RNTI may only serve the MBS service, for unicast service, a similar mechanism may be adopted. In particular, if the unicast service that the terminal device 110 is receiving has stringent packet loss rate requirements (or if it can tolerate high amount of retransmissions and/or may not have stringent delay requirements), the network device 120 may configure the second DL configuration information for the unicast service to be a first predetermined value (1, for example), so that the terminal device 110 may send a NACK for the DL data transmission occasion when this unicast service is received with an error along with other frequency-multiplexed transmissions. In this way, an error in the corresponding unicast service may lead to a NACK in the semi-static HARQ-ACK codebook for the corresponding DL data transmission occasion, and thus the network device 120 should retransmit all of the at least two DL transmissions, as in the method 300.

Please note that although the method 400 is illustrated in FIG. 4 as a complete procedure, those skilled in the art may understand that the two branches may be implemented independently. That is, the network device 120 may configure the DL configuration information only in G-RNTI for a specific MBS service or only in user-specific control signaling such as user-specific RRC signaling for unicast services. In this case, the method 400 may be split into two separate procedures each of which includes only the branch of blocks 410, 420, 430, 440, 450, 460 or the branch of blocks 410, 470, 480, 490, 440, 460.

Figure 5:
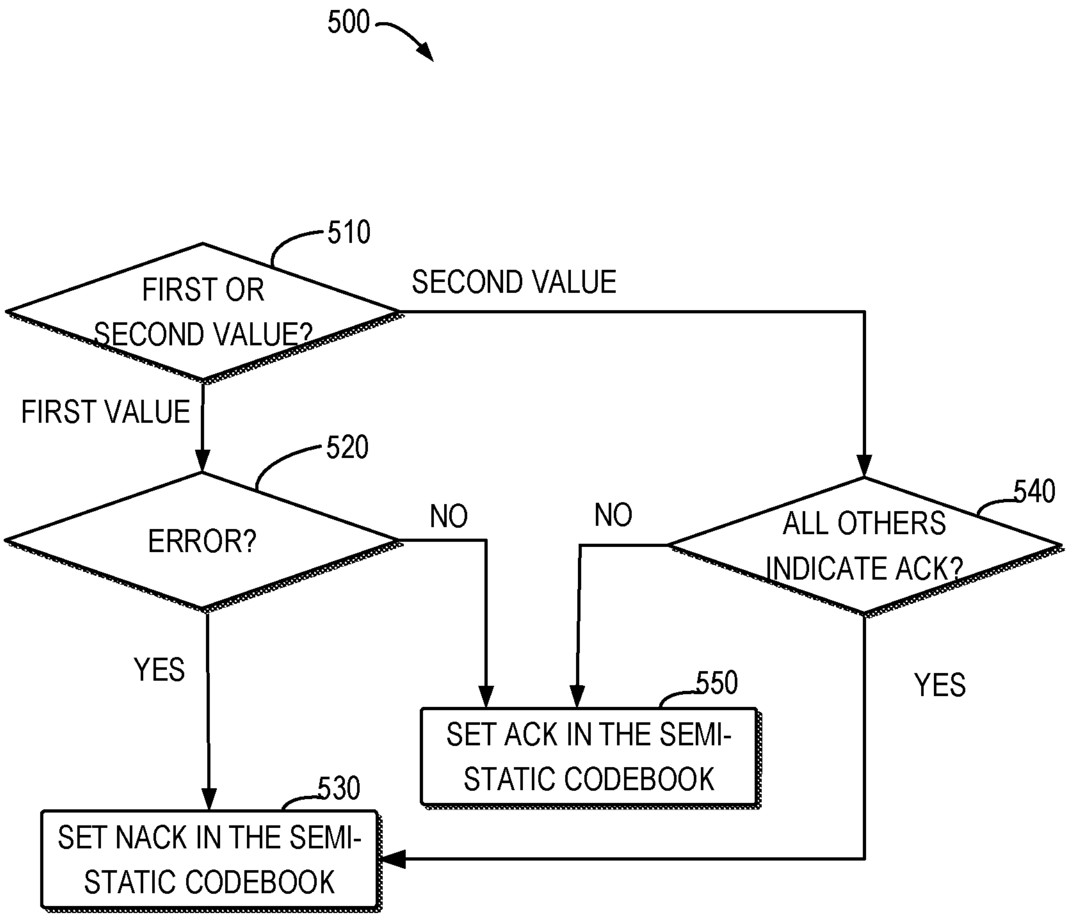
FIG. 5 illustrates a flowchart of a further example method implemented at a terminal device in accordance with some further example embodiments of the present disclosure.

FIG. 5 shows a flowchart of a further example method 500 implemented at a terminal device 110 in accordance with some further example embodiments of the present disclosure. Especially, the example method 500 may illustrate a further implementation of block 230 of FIG. 2, and other blocks, such as blocks 210 and 220, are omitted from FIG. 5 to make it concise. In the example method 500, DCI may be reused to carry the DL configuration information.

In particular, the network device 120 may add a new 1-bit field or reuse a 1-bit field of the DCI to include the DL configuration information. This field may indicate how the terminal device 110 should include an acknowledgement indication (ACK or NACK) to the semi-static HARQ-ACK codebook for a DL data transmission occasion such as a PDSCH occasion when there are frequency-multiplexed unicast/MBS services for predetermined services (unicast services and/or MBS services). The terminal device 110 may determine whether the received DL transmission scheduled by the DCI is received with an error and set an ACK or NACK based on the error state of the scheduled DL transmission and the value of the DL configuration information.

Please note that the example method 500 only illustrates the case that at least two frequency-multiplexed DL transmissions are received at a DL data transmission occasion, if there are no frequency-multiplexed DL transmissions for the DL data transmission occasion, i.e., only one unicast or MBS transmission is received, the terminal device 110 may follow previous HARQ-ACK codebook construction procedure such as that in 3GPP Rel-15/16.

At block 510 of the method 500, the terminal device 110 may determine a value of the DL configuration information.

If it is determined that the value of the DL configuration information is a first value (1, for example), at block 520, the terminal device 110 may determine whether the DL data transmission scheduled by the DCI is received with error.

If it is determined that the DL data transmission scheduled by the DCI is received with error ("YES" at block 520), at block 530, the terminal device 110 may set the acknowledgement indication to be a NACK based on the first value of the DL configuration information. If it is determined that the DL data transmission scheduled by the DCI is received without error ("NO" at block 520), at block 550, the terminal device 110 may set the acknowledgement indication to be ACK if all other DL data transmissions indicate ACKs. That is, if the DL configuration information is set to be the first value, the acknowledgement indication for this DL data transmission occasion should be set to ACK only if all other DL data transmissions indicate ACKs.

Otherwise, if it is determined that the value of the DL configuration information is a second value (0, for example) at block 510, at block 540, the terminal device 110 may determine whether all other DL data transmissions indicate ACKs.

If it is determined that all other DL data transmissions indicate ACKs ("YES" at block 540), at block 550, the terminal device 110 may set the acknowledgement indication to be an ACK. If it is determined that not all other DL data transmissions indicate ACKs ("NO" at block 540), the method 500 goes to block 530, in which the terminal device 110 may set the acknowledgement indication to be a NACK. That is, if the DL configuration information is set to a second value, regardless of whether the DL data transmission scheduled by the DCI is received with error or not, the acknowledgement indication for this DL data transmission occasion should be set to ACK or NACK depending on whether all other DL data transmissions indicate ACKs or NACKs at this DL data transmission occasion.

On the other hand, if it is determined at block 520 that the DL data transmission scheduled by the DCI is received without error ("NO" at block 520), the terminal device 110 may set the acknowledgement indication in the semi-static HARQ-ACK codebook to be ACK if the acknowledgement indications for all other DL transmissions are ACKs (not shown in the figure).

The method 500 may be adaptively applied for different services with different requirements such as packet loss rate requirements. For example, if the unicast/MBS service that the terminal device 110 is receiving has stringent packet loss rate requirements (or if it can tolerate high amount of retransmissions and/or may not have stringent delay requirements), the network device 120 may configure the DL configuration information in the DCI such that the terminal device 110 should send a NACK for the DL data transmission occasion when this unicast/MBS service is received with error along with other frequency-multiplexed transmissions at the same DL data transmission occasion. In this way, only an error in the corresponding unicast/MBS DL transmission may lead to a NACK in the semi-static HARQ-ACK codebook for the corresponding DL data transmission occasion, and thus the network device 120 should retransmit all of the at least two DL transmissions.

Compared to the method 400, the method 500 allows more dynamic configuration on how to include an ACK/NACK for a certain DL data transmission occasion when frequency-multiplexed transmissions take place. Instead of service-wise configuration as in the method 400, the method 500 follows a granularity in the level of PDSCH transmissions.

In the above, depending on the DL configuration information, the methods 300 to 500 are described to detail how the acknowledgement indication should be set in the semi-static HARQ-ACK codebook for a DL data transmission occasion at which at least two frequency-multiplexed DL transmissions are received. In some further embodiments, the methods 300 to 500 may be implemented in combination. For example, the method 300 may be implemented in combination with the method 400 or 500. In this regard, rules should be defined for over controlling respective sub-solutions of the methods 300 to 500.

In particular, before block 230 or at the beginning of block 230, the terminal device 110 may determine whether it has received the user-specific control signaling that includes the DL configuration information as method 300 and if such user-specific control signaling that includes the DL configuration information is not received, the terminal device 110 may go to the method 400 or 500 to set the ACK/NACK in the semi-static HARQ-ACK codebook.

On the other hand, if the terminal device 110 has determined that it has received the user-specific control signaling that includes the DL configuration information as method 300, it may further determine whether one of the received DL data transmissions is scheduled by DCI that includes the DL configuration information as method 500. If it is determined that one of the received DL data transmissions is scheduled by DCI that includes the DL configuration information as method 500, it may go to method 500 for that DL data transmission. Accordingly, if NACK is indicated from method 500 for that DL data transmission, the terminal device 110 should set NACK in the semi-static HARQ-ACK codebook, independent of the ACK/NACK indication of other frequency-multiplexed DL transmissions for that DL transmission occasion. Otherwise, the terminal device 110 should set the semi-static HARQ-ACK codebook based on ACK/NACK indication of other frequency-multiplexed DL transmissions for that DL transmission occasion.

Otherwise, if it is determined that none of the received DL data transmissions is scheduled by DCI that includes the DL configuration information as method 500, the terminal device 110 may further determine whether it has received the G-RNTI including the first DL configuration information for an MBS service and/or the user-specific control signaling including the second DL configuration information for a unicast service. If the terminal device 110 has received such G-RNTI or user-specific control signaling, it may go to the method 400 for that DL data transmission. Accordingly, if NACK is indicated from method 400 for that DL data transmission, the terminal device 110 should set NACK in the semi-static HARQ-ACK codebook, independent of the ACK/NACK indication of other frequency-multiplexed DL transmissions for that DL transmission occasion. Otherwise, the terminal device 110 should set the semi-static HARQ-ACK codebook based on ACK/NACK indication of other frequency-multiplexed DL transmissions for that DL transmission occasion.

Otherwise, the terminal device may go to method 300.

That is to say, in the combination of the method 300 with 400 or 500, the method 400 or 500 may over control the ACK/NACK regardless of the determination result of the method 300. For example, if it is determined at block 310 the value of the DL configuration information is the second value (0, for example), and if it is determined at block 340 that not all DL data transmissions are received with error, the method 300 will not set ACK directly at block 350, but goes to the method 400 or 500 to see whether NACK should be set for this DL data transmission occasion. If the method 400 or 500 determines that NACK should be set for this DL data transmission occasion, the terminal device 110 will set NACK in the semi-static HARQ-ACK codebook regardless of the determination result of the method 300.

In some example embodiments, an apparatus is provided capable of performing any of the methods 300 to 500. The apparatus may include means for receiving, at a first device, DL configuration information from a second device, means for receiving at least two frequency-multiplexed DL data transmissions at one DL data transmission occasion, and means for setting, based on the DL configuration information and an error state of the frequency-multiplexed DL data transmissions, an acknowledgement indication in a semi-static HARQ-ACK codebook to be transmitted to the second device for the DL data transmission occasion. The means may be implemented in any suitable form. For example, the means may be implemented in a circuitry or software module.

In some example embodiments, the means for receiving comprises means for receiving user-specific control signaling from the second device including the downlink configuration information indicating how to set the acknowledgement indication in the semi-static HARQ-ACK codebook.

In these example embodiments, the means for setting comprises means for determining a value of the downlink configuration information, means for determining whether one of the at least two frequency-multiplexed downlink data transmissions is received with error in accordance with a determination that the value of the downlink configuration information is a first value; and means for setting, based on the first value of the downlink configuration information, the acknowledgement indication to be a negative acknowledgement in accordance with a determination that at least one of the at least two frequency-multiplexed downlink data transmissions is received with error.

In some example embodiments, the means for setting further comprises means for determining whether none of the at least two frequency-multiplexed downlink data transmissions are received with error in accordance with a determination that the value of the downlink configuration information is a first value; and means for setting, based on the first value of the downlink configuration information, the acknowledgement indication to be a positive acknowledgement in accordance with a determination that none of the at least two frequency-multiplexed downlink data transmissions are received with error.

In some example embodiments, the means for setting comprises means for determining whether all of the at least two frequency-multiplexed downlink data transmissions are received with error in accordance with a determination that the value of the downlink configuration information is a second value, and means for setting, based on the second value of the downlink configuration information, the acknowledgement indication to be a negative acknowledgement in accordance with a determination that all of the at least two frequency-multiplexed downlink data transmissions are received with error.

In some example embodiments, the means for setting further comprises means for determining whether all of the at least two frequency-multiplexed downlink data transmissions are received with error in accordance with a determination that the value of the downlink configuration information is a second value; and means for setting, based on the second value of the downlink configuration information, the acknowledgement indication to be a positive acknowledgement in accordance with a determination that not all of the at least two frequency-multiplexed downlink data transmissions are received with error.

In some example embodiments, the means for receiving comprises means for receiving a group-common Radio Network Temporary Identifier, G-RNTI, configuration from the second device including first downlink configuration information as the downlink configuration information indicating how to set the acknowledgement indication in the semi-static HARQ-ACK codebook for a multicast or broadcast service of the first device.

In some example embodiments, the means for setting comprises means for determining whether the at least two frequency-multiplexed downlink data transmissions includes a multicast or broadcast downlink transmission corresponding to the G-RNTI, means for determining a value of the first downlink configuration information in accordance with a determination that the at least two frequency-multiplexed downlink data transmissions includes the multicast or broadcast downlink transmission corresponding to the G-RNTI, means for determining whether the multicast or broadcast downlink transmission corresponding to the G-RNTI is received with error in accordance with a determination that the value of the first downlink configuration information is a first value, and means for setting the acknowledgement indication to be a negative acknowledgement based on the first value of the first downlink configuration information in accordance with a determination that the multicast or broadcast downlink transmission corresponding to the G-RNTI is received with error.

In some example embodiments, the means for setting further comprises means for setting the acknowledgement indication to be a positive acknowledgement if all other downlink data transmissions of the at least two frequency-multiplexed downlink data transmissions are received without error in accordance with a determination that the multicast or broadcast downlink transmission corresponding to the G-RNTI is received without error.

In some example embodiments, the means for setting further comprises means for determining whether all other downlink data transmissions of the at least two frequency-multiplexed downlink data transmissions indicate positive acknowledgements in accordance with a determination that the value of the first downlink configuration information is a second value, and means for setting the acknowledgement indication to be a positive acknowledgement in accordance with a determination that all other downlink data transmissions of the at least two frequency-multiplexed downlink data transmissions indicate positive acknowledgements.

In some example embodiments, the means for setting further comprises means for setting the acknowledgement indication to be a negative acknowledgement in accordance with a determination that not all other downlink data transmissions of the at least two frequency-multiplexed downlink data transmissions indicate positive acknowledgements.

In some example embodiments, the means for receiving comprises means for receiving user-specific control signaling from the second device including second downlink configuration information as the downlink configuration information indicating how to set the acknowledgement indication in the semi-static HARQ-ACK codebook for a unicast service of the first device.

In some example embodiments, the means for setting comprises means for determining whether the at least two frequency-multiplexed downlink data transmissions includes a unicast downlink transmission scrambled by a user-specific RNTI, means for determining a value of the second downlink configuration information in accordance with a determination that the at least two frequency-multiplexed downlink data transmissions include a unicast downlink transmission scrambled by the user-specific RNTI, means for determining whether the unicast downlink transmission is received with error in accordance with a determination that the value of the second downlink configuration information is a first value, and means for setting the acknowledgement indication to be a negative acknowledgement based on the first value of the second downlink configuration information in accordance with a determination that the unicast downlink transmission is received with error.

In some example embodiments, the means for setting comprises means for setting the acknowledgement indication to be a positive acknowledgement if all other downlink data transmissions of the at least two frequency-multiplexed downlink data transmissions are received without error in accordance with a determination that the unicast downlink transmission is received without error.

In some example embodiments, the means for setting further comprises means for determining whether all other downlink data transmissions of the at least two frequency-multiplexed downlink data transmissions indicate positive acknowledgements in accordance with a determination that the value of the second downlink configuration information is a second value, and means for setting the acknowledgement indication to be a positive acknowledgement in accordance with a determination that all other downlink data transmissions of the at least two frequency-multiplexed downlink data transmissions indicate positive acknowledgements.

In some example embodiments, the means for setting further comprises means for in accordance with a determination that not all other downlink data transmissions of the at least two frequency-multiplexed downlink data transmissions indicate positive acknowledgements, setting the acknowledgement indication to be a negative acknowledgement.

In some example embodiments, the second downlink configuration information includes a plurality of fields for unicast services with different priorities.

In some example embodiments, the means for setting comprises means for determining whether the at least two frequency-multiplexed downlink data transmissions includes a unicast downlink transmission scrambled by a user-specific RNTI corresponding to at least one unicast service with one priority, means for determining a value of the second downlink configuration information accordance with a determination that the at least two frequency-multiplexed downlink data transmissions include a unicast downlink transmission scrambled by a user-specific RNTI corresponding to at least one unicast service with one priority, means for determining whether the unicast downlink transmission is received with error in accordance with a determination that the value of the second downlink configuration information is a third value, and means for setting, based on the third value of the second downlink configuration information corresponding to the at least one unicast service, the acknowledgement indication to be a negative acknowledgement in accordance with a determination that the unicast downlink transmission is received with error.

In some example embodiments, the means for setting further comprises means for in accordance with a determination that the unicast downlink transmission is received without error, setting the acknowledgement indication to be a positive acknowledgement if all other downlink data transmissions of the at least two frequency-multiplexed downlink data transmissions are received without error.

In some example embodiments, the means for setting further comprises means determining whether all other downlink data transmissions of the at least two frequency-multiplexed downlink data transmissions indicate positive acknowledgements for in accordance with a determination that the value of the second downlink configuration information is a fourth value, and means for setting the acknowledgement indication to be a positive acknowledgment in accordance with a determination that all other downlink data transmissions of the at least two frequency-multiplexed downlink data transmissions indicate positive acknowledgements.

In some example embodiments, the means for receiving comprises means for, in accordance with a determination that not all other downlink data transmissions of the at least two frequency-multiplexed downlink data transmissions indicate positive acknowledgements, setting the acknowledgement indication to be a negative acknowledgement.

In some example embodiments, the means for receiving comprises means for receiving Downlink Control Information, DCI, that is scheduling one of the at least two frequency-multiplexed downlink data transmissions from the second device including the downlink configuration information indicating how to set the acknowledgement indication in the semi-static HARQ-ACK codebook for a downlink data transmission that the DCI is scheduling.

In some example embodiments, the means for setting comprises means for determining a value of the downlink configuration information, means for determining whether the downlink data transmission that is scheduled by the DCI is received with error in accordance with a determination that the value of the downlink configuration information is a first value, and means for setting the acknowledgement indication to be a negative acknowledgement based on the first value of the downlink configuration information in accordance with a determination that the downlink data transmission that is scheduled by the DCI is received with error.

In some example embodiments, the means for setting further comprises means for in accordance with a determination that the downlink data transmission that is scheduled by the DCI is received without error, setting the acknowledgement indication to be a positive acknowledgement if all other downlink data transmissions of the at least two frequency-multiplexed downlink data transmissions are received without error.

In some example embodiments, the means for setting further comprises means for determining whether all other downlink data transmissions of the at least two frequency-multiplexed downlink data transmissions indicate positive acknowledgements in accordance with a determination that the value of the downlink configuration information is a second value, and means for setting the acknowledgement indication to be a positive acknowledgement in accordance with a determination that all other downlink data transmissions of the at least two frequency-multiplexed downlink data transmissions indicate positive acknowledgements.

In some example embodiments, the means for setting further comprises means for in accordance with a determination that not all other downlink data transmissions of the at least two frequency-multiplexed downlink data transmissions indicate positive acknowledgements, setting the acknowledgement indication to be a negative acknowledgement.

In some example embodiments, the first device is a terminal device and the second device is a network device communicating with the terminal device.

Figure 6:
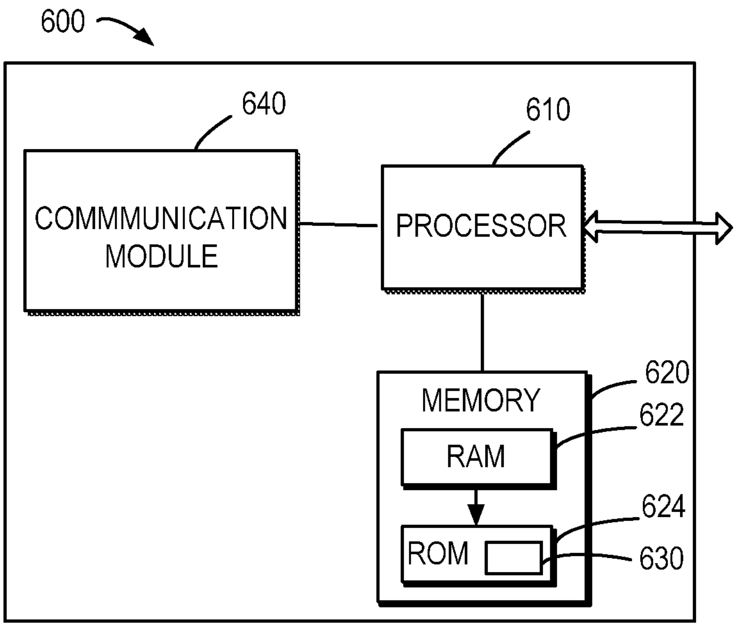
FIG. 6 illustrates a simplified block diagram of an apparatus that is suitable for implementing example embodiments of the present disclosure.

FIG. 6 is a simplified block diagram of a device 600 that is suitable for implementing example embodiments of the present disclosure. The device 600 may be provided to implement the communication device, for example the terminal device 110 or the network device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the memory, e.g., ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIGS. 2 to 5. The example embodiments of the present disclosure may also be implemented by hardware or by a combination of software and hardware.

Figure 7:
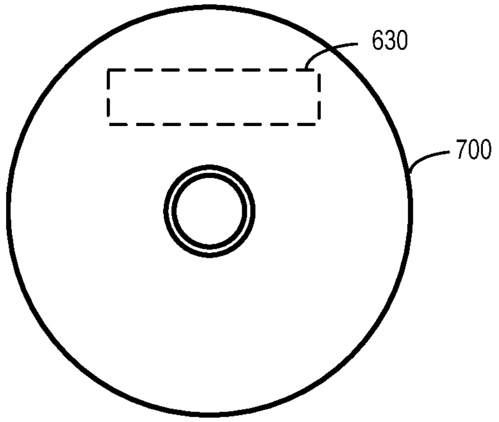
FIG. 7 illustrates a block diagram of an example computer readable medium in accordance with some example embodiments of the present disclosure.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium 700 has the program 630 stored thereon.

In the description, the solution of the present disclosure is described by taking the terminal device as the first device and the network device as the second device. However, those skilled in the art may understand that the present disclosure is not limited thereto, where applicable, the operations of the terminal device may also be implemented at the network, and vice versa.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600 as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus, comprising:

at least one processor; and at least one memory including program code, the at least one memory and the program code being configured to, with the at least one processor, cause the apparatus at least to:

receive downlink configuration information from a network device, receive at least two frequency-multiplexed downlink data transmissions at one downlink data transmission occasion, the at least two frequency-multiplexed downlink data transmissions including one or more multicast or broadcast downlink transmissions, and set, based on the downlink configuration information and an error state of the at least two frequency-multiplexed downlink data transmissions, a single acknowledgement indication in a semi-static hybrid automatic repeat request acknowledgement codebook to be transmitted to the network device for the one downlink data transmission occasion;

wherein the downlink configuration information indicates how to set the single acknowledgement indication in the semi-static hybrid automatic repeat request acknowledgement codebook.

2. The apparatus of claim 1, wherein the at least two frequency-multiplexed downlink data transmissions include a unicast downlink transmission frequency-multiplexed with the one or more multicast or broadcast downlink transmissions.

3. The apparatus of claim 1, wherein the one or more multicast or broadcast downlink transmissions include at least two frequency-multiplexed multicast or broadcast downlink transmissions.

4. The apparatus of claim 1, wherein the apparatus is caused to receive the downlink configuration information from the network device by:

receiving user-specific control signaling including the downlink configuration information indicating how to set the single acknowledgement indication in the semi-static hybrid automatic repeat request acknowledgement codebook, and wherein the apparatus is caused to set the single acknowledgement indication by:

determining a value of the downlink configuration information, in accordance with a determination that the value of the downlink configuration information is a first value, determining whether one of the at least two frequency-multiplexed downlink data transmissions is received with error; and in accordance with a determination that at least one of the at least two frequency-multiplexed downlink data transmissions is received with error, setting, based on the first value of the downlink configuration information, the single acknowledgement indication to be a negative acknowledgement.

5. The apparatus of claim 4, wherein the apparatus is caused to set the single acknowledgement indication by:

in accordance with the determination that the value of the downlink configuration information is the first value, determining whether none of the at least two frequency-multiplexed downlink data transmissions are received with error; and in accordance with a determination that none of the at least two frequency-multiplexed downlink data transmissions are received with error, setting, based on the first value of the downlink configuration information, the single acknowledgement indication to be a positive acknowledgement.

6. The apparatus of claim 4, wherein the apparatus is caused to set the single acknowledgement indication by:

in accordance with a determination that the value of the downlink configuration information is a second value, determining whether all of the at least two frequency-multiplexed downlink data transmissions are received with error, and in accordance with a determination that all of the at least two frequency-multiplexed downlink data transmissions are received with error, setting, based on the second value of the downlink configuration information, the single acknowledgement indication to be a negative acknowledgement.

7. The apparatus of claim 6, wherein the apparatus is caused to set the single acknowledgement indication by:

in accordance with the determination that the value of the downlink configuration information is the second value, determining whether all of the at least two frequency-multiplexed downlink data transmissions are received with error; and in accordance with a determination that not all of the at least two frequency-multiplexed downlink data transmissions are received with error, setting, based on the second value of the downlink configuration information, the single acknowledgement indication to be a positive acknowledgement.

8. The apparatus of claim 1, wherein the apparatus is caused to receive the downlink configuration information from the network device by:

receiving a group-common Radio Network Temporary Identifier configuration including first downlink configuration information as the downlink configuration information indicating how to set the single acknowledgement indication in the semi-static hybrid automatic repeat request acknowledgement codebook for a multicast or broadcast service, and wherein the apparatus is caused to set the single acknowledgement indication by:

determining whether the at least two frequency-multiplexed downlink data transmissions include a multicast or broadcast downlink transmission corresponding to the group-common Radio Network Temporary Identifier, in accordance with a determination that the at least two frequency-multiplexed downlink data transmissions include the multicast or broadcast downlink transmission corresponding to the group-common Radio Network Temporary Identifier, determining a value of the first downlink configuration information, in accordance with a determination that the value of the first downlink configuration information is a first value, determining whether the multicast or broadcast downlink transmission corresponding to the group-common Radio Network Temporary Identifier is received with error, and in accordance with a determination that the multicast or broadcast downlink transmission corresponding to the group-common Radio Network Temporary Identifier is received with error, setting the single acknowledgement indication to be a negative acknowledgement based on the first value of the first downlink configuration information.

9. The apparatus of claim 8, wherein the apparatus is caused to set the single acknowledgement indication by:

in accordance with a determination that the multicast or broadcast downlink transmission corresponding to the group-common Radio Network Temporary Identifier is received without error, setting the single acknowledgement indication to be a positive acknowledgement if all other downlink data transmissions of the at least two frequency-multiplexed downlink data transmissions indicate positive acknowledgements.

10. The apparatus of claim 8, wherein the apparatus is caused to set the single acknowledgement indication by:

in accordance with a determination that the value of the first downlink configuration information is a second value, determining whether all other downlink data transmissions of the at least two frequency-multiplexed downlink data transmissions indicate positive acknowledgements, and in accordance with a determination that all other downlink data transmissions of the at least two frequency-multiplexed downlink data transmissions indicate positive acknowledgements, setting the single acknowledgement indication to be a positive acknowledgement.

11. The apparatus of claim 10, wherein the apparatus is caused to set the single acknowledgement indication by:

in accordance with a determination that not all other downlink data transmissions of the at least two frequency-multiplexed downlink data transmissions indicate positive acknowledgements, setting the single acknowledgement indication to be a negative acknowledgement.

12. The apparatus of claim 10, wherein the group-common Radio Network Temporary Identifier configuration further includes second downlink configuration information as the downlink configuration information; and the determining of whether all the other downlink data transmissions of the at least two frequency-multiplexed downlink data transmissions indicate positive acknowledgements is also in accordance with a determination that a value of the second downlink configuration information is the second value.

13. The apparatus of claim 12, wherein the apparatus is caused to set the single acknowledgement indication by:

in accordance with a determination that not all other downlink data transmissions of the at least two frequency-multiplexed downlink data transmissions indicate positive acknowledgements, setting the single acknowledgement indication to be a negative acknowledgement.

14. The apparatus of claim 1, wherein the apparatus is caused to receive the downlink configuration information from the network device by:

receiving downlink control information that is scheduling one of the at least two frequency-multiplexed downlink data transmissions including the downlink configuration information indicating how to set the single acknowledgement indication in the semi-static hybrid automatic repeat request acknowledgement codebook for a downlink data transmission that the downlink control information is scheduling, and wherein the apparatus is caused to set the single acknowledgement indication by:

determining a value of the downlink configuration information, in accordance with a determination that the value of the downlink configuration information is a first value, determining whether the downlink data transmission that is scheduled by the downlink control information is received with error, and in accordance with a determination that the downlink data transmission that is scheduled by the downlink control information is received with error, setting the single acknowledgement indication to be a negative acknowledgement based on the first value of the downlink configuration information.

15. The apparatus of claim 14, wherein the apparatus is caused to set the single acknowledgement indication by:

in accordance with a determination that the downlink data transmission that is scheduled by the downlink control information is received without error, setting the single acknowledgement indication to be a positive acknowledgement if all other downlink data transmissions of the at least two frequency-multiplexed downlink data transmissions indicate positive acknowledgements.

16. The apparatus of claim 14, wherein the apparatus is caused to set the single acknowledgement indication by:

in accordance with a determination that the value of the downlink configuration information is a second value, determining whether all other downlink data transmissions of the at least two frequency-multiplexed downlink data transmissions indicate positive acknowledgements, and in accordance with a determination that all other downlink data transmissions of the at least two frequency-multiplexed downlink data transmissions indicate positive acknowledgements, setting the single acknowledgement indication to be a positive acknowledgement.

17. The apparatus of claim 16, wherein the apparatus is caused to set the single acknowledgement indication by:

in accordance with a determination that not all other downlink data transmissions of the at least two frequency-multiplexed downlink data transmissions indicate positive acknowledgements, setting the single acknowledgement indication to be a negative acknowledgement.

18. The apparatus of claim 1, wherein the apparatus is a user equipment and the network device is a base station communicating with the user equipment.

19. An apparatus, comprising:

at least one processor; and at least one memory including program code, the at least one memory and the program code being configured to, with the at least one processor, cause the apparatus at least to:

send, to a user equipment, downlink configuration information; and send at least two frequency-multiplexed downlink data transmissions at one downlink data transmission occasion, the at least two frequency-multiplexed downlink data transmissions including one or more multicast or broadcast downlink transmissions;

wherein the downlink configuration information indicates to the user equipment how to set a single acknowledgement indication in a semi-static hybrid automatic repeat request acknowledgement codebook when receiving the at least two frequency-multiplexed downlink data transmissions at the one downlink data transmission occasion.

20. A method, comprising:

receiving, at a user equipment, downlink configuration information from a network device, receiving at least two frequency-multiplexed downlink data transmissions at one downlink data transmission occasion, the at least two frequency-multiplexed downlink data transmissions including one or more multicast or broadcast downlink transmissions, and setting, based on the downlink configuration information and an error state of the at least two frequency-multiplexed downlink data transmissions, a single acknowledgement indication in a semi-static hybrid automatic repeat request acknowledgement codebook to be transmitted to the network device for the one downlink data transmission occasion.

* * * * *